Oct. 18, 1938.  S. L. LEBBY  2,133,664
COVER GLASS
Filed Feb. 4, 1935
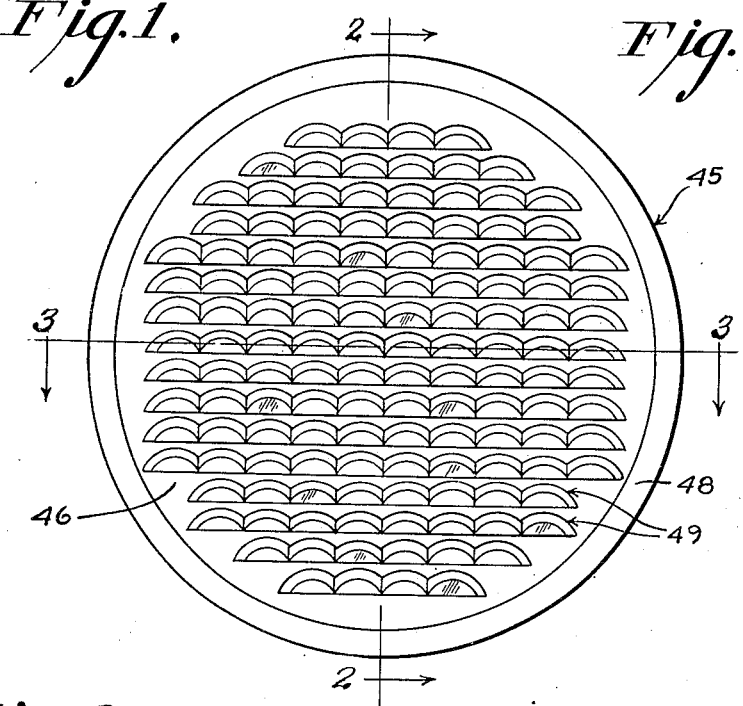
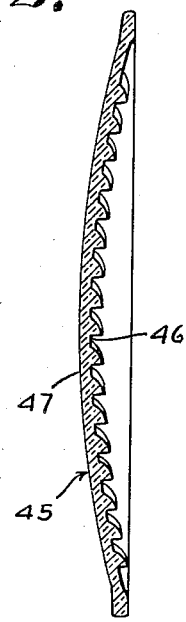
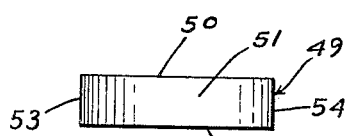
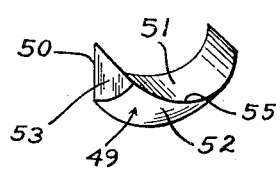
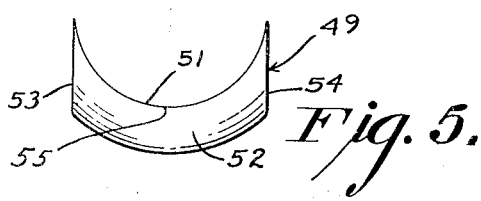
INVENTOR.
STATES LEE LEBBY
BY
ATTORNEYS.

Patented Oct. 18, 1938

2,133,664

UNITED STATES PATENT OFFICE 2,133,664

COVER GLASS

States Lee Lebby, Corning, N. Y., assignor to Corning Glass Works, Corning, N. Y., a corporation of New York Application February 4, 1935, Serial No. 4,923

4 Claims. (Cl. 177—329)

This invention relates to cover glasses and more particularly to a cover glass having certain refractive characteristics that render it especially adapted for use in signalling and floodlighting.

In signalling and floodlighting equipment, it is customary to utilize cover glasses placed in front of the light projecting system to shield it and also to modify the color and direction of the beam of light coming therefrom.

It is desirable that the cover glass so alter the beam as to avoid wasteful consumption of power and to this end the light beam must be so directed and controlled as to produce the desired distribution of light over the area or areas to be illuminated.

My invention is directed to the proper control and distribution of a beam of light and to obtain the correct distribution of light intensities throughout both the primary and secondary or deflected beams emanating from a projecting system of which my cover glass constitutes a part.

The object of this invention is to so control and govern the light emanating from a projector as to permit a portion of it to illuminate the upper reaches of the façade of a building while another portion of the beam is spread asymmetrically in one plane and spread symmetrically in a plane at right angles to the plane of asymmetric spread so as to illuminate those portions of the façade nearer to the source of illumination.

Another object is to produce a spreading secondary beam which progressively diminishes in intensity as it recedes from the main high intensity beam so as to produce a substantially uniform degree of illumination over the entire area to be illuminated.

Among its features my invention embodies a projector for producing a primary beam of substantially parallel light which projector is fitted with my improved cover glass, the latter having a plurality of uniformly distributed light deflecting members on one surface for interrupting and redirecting predetermined limited portions of the light of the primary beam into a deflected secondary beam.

Other features embody so curving certain sides which I shall hereinafter term active sides of the light deflecting members that each light deflecting member takes the form of a solid section of a torus.

Still other features embody so curving and proportioning the active toric surfaces of the light deflecting members that unusual distributions of light and light intensities can be produced in the deflected secondary beam.

In the drawing:

Fig. 1 is a view of the inside face of a cover glass embodying my invention;

Fig. 2 is a sectional view taken on the line 2—2 of Fig. 1;

Fig. 3 is a sectional view taken on the line 3—3 of Fig. 1;

Fig. 4 is an enlarged plan view of one of the light deflecting members;

Fig. 5 is a face view of Fig. 4;

Fig. 6 is a perspective view of one of the light deflecting members.

Referring to the drawing in detail, a cover glass designated generally 45 constituting a transparent plate having an inner face 46, an outer face 47, and a circumferential flange 48, carries a plurality of light deflecting members designated generally 49, which are preferably formed integral therewith though it is evident that they may be formed as separate units and attached to the cover glass by the use of a transparent cement.

Each light deflecting member 49 is composed of a body of transparent material having five sides 50, 51, 52, 53, and 54 with the side 50 contiguous with the inner face 46 of the cover glass 45, while the sides 51 and 52 converge to form a curved ridge 55 which lies in a plane substantially parallel with the face 46 of the cover glass. The side 51 is substantially cylindrical in form and projects outwardly from the face 46 of the cover glass substantially perpendicular thereto so as to have no refracting power for parallel light projected onto the cover glass, while the side 52 curves outwardly from the side 50 and joins the side 51 at the ridge 55, thus producing a light deflecting member which assumes the form of a solid section of a torus. As a result, the light deflecting members 49 are substantially triangular in cross-section and the edges of the sides 53 and 54 which join the side 52 will lie along curved lines as illustrated in Fig. 6. For the sake of convenience in manufacture, the space within the cylindrical side 51 of each light deflecting member is left filled with the transparent material from which the light deflecting member is formed and the light deflecting members are formed integral with the inner face 46 of the cover glass 45.

In use it will be seen that rays of parallel light projected upon the inner face of the cover glass 45 will pass directly through these portions of the cover glass which are normal thereto and thus produce what I choose to hereinafter call a primary beam. Those rays which fall upon the light deflecting members, however, will be deflected and spread into what I choose to call a secondary beam which is projected asymmetrically with relation to the axis of the primary beam and spread symmetrically on both sides of its asymmetric plane. This produces a fan-shaped secondary beam, the distribution of the light intensities of which can be readily controlled by altering the smaller curvature of the toric sides 52 of the light deflecting members 49.

By the term "torus" as herein used, I mean a body having a convex surface which is generated by the revolution of a conic section around an axis which lies in the plane of the generating curve but does not pass through its center.

By the expression "toric surface" as herein used, I mean a surface which is generated by the revolution of a conic section around an axis which lies in the plane of the generating curve but does not pass through its center.

I claim:

1. In a cover glass for intercepting and refracting a portion of a beam of substantially parallel light in combination, a cover glass body of substantially uniform thickness, a row of light deflecting members on one face of said body, each of said members comprising a surface contiguous with said face of the body, a second surface substantially parallel therewith, and a toric surface intermediate the aforementioned surfaces, said toric surfaces having their axes of generation substantially normal to the face of said cover glass and so spaced that they intersect to limit the lateral refraction of the light to a given angle.

2. In a cover glass for intercepting and refracting a portion of a beam of substantially parallel light in combination, a cover glass body of substantially uniform thickness, a row of light deflecting members on one face of said body, each of said members having at least two exposed surfaces, one of said surfaces being substantially parallel with the beam of parallel light and another of said surfaces having a toric configuration, said toric surfaces having their axes of generation substantially normal to the face of the cover glass body and so spaced that they intersect to limit the lateral refraction of the light to a given angle.

3. In a cover glass for intercepting and refracting a portion of a beam of substantially parallel light in combination, a cover glass body of substantially uniform thickness, a row of light diffusing members carried on one face of said body, each of said members having two exposed surfaces, one of said surfaces being substantially parallel with the beam of parallel light and the other of said surfaces having a toric configuration, said toric surfaces having their axes of generation substantially normal to the surface of the cover glass body and so spaced that they intersect to limit the lateral refraction of the light to a given angle.

4. In a cover glass for intercepting and refracting a portion of a beam of substantially parallel light in combination, a cover glass body of substantially uniform thickness, a row of light diffusing members carried on one face of said body, each of said members having two exposed surfaces, one of said surfaces being substantially parallel with the beam of parallel light and the other of said surfaces having a toric configuration, said toric surfaces having their axes of generation substantially normal to the surface of the cover glass body and so spaced that they intersect to limit the lateral refraction of the light to a given angle, said two exposed surfaces intersecting in a line lying in a plane substantially parallel to the surface of the cover glass body.

STATES LEE LEBBY.